United States Patent Office 3,340,153
Patented Sept. 5, 1967

3,340,153
MILK SOLIDS IN A LIQUID COSMETIC
PREPARATION
Werner Kast, Erding, Bavaria, Germany, assignor to
Adolf Fischer, Bavaria, Germany
No Drawing. Filed June 25, 1963, Ser. No. 290,298
Claims priority, application Germany, June 29, 1962,
K 47,110
3 Claims. (Cl. 167—90)

The invention relates to a liquid cosmetic preparation for cleansing and soothing the skin.

The object of the invention is to provide a cosmetic preparation containing milk solids in wholly soluble form that will be particularly efficient in cleansing the skin while also having a soothing effect.

The cosmetic preparation according to the invention contains milk solids (which may be fat-free) and at least one surface-active compound selected from the group consisting of the alcohol sulfates, the alkyl sulfonates, the fatty alcohol ether sulfates and the alkyl-substituted aromatic sulfonates, in either acid or salt form, dissolved in water. The solution may also contain inorganic salts that will not interfere with its cosmetic effects.

To prepare the cosmetic preparation, the surface-active agent or agents is first dissolved in water and the solution heated, for instance over a water bath, to about 40° C. If desired, a foam suppressant such as a fatty acid alkylolamide, can be used. This is melted separately and added to the heated surface-active agent solution; generally a quantity of foam depressant amounting to about 10% by weight of the total weight of the surface-active agents is used.

In a separate vessel, milk solids powder, for example a fat free milk powder such as skim milk powder, is mixed with water. Instead of the skim milk powder a liquid skim milk concentrate may be used. The heated mixture of surface-active substances and optional foam depressant is mixed with the mixture of skim milk powder and water at about 40° C. Additional optional ingredients, such as deodorants, perfumes or preservatives, are added and the mixture is homogenized. If desired, the mixture is kept for 10 to 12 hours at an elevated temperature, for example between 70° and 80° C., in order to remove air bubbles and to increase the stability of the mixture through the pasteurizing effect of the heating. The finished product is transparent if fat-free milk solids are used. To increase stability it is favorable quickly to cool the product thus prepared.

If it is desirable that the cosmetic preparation should be oily in nature, a suitable amount of vegetable oil may be added immediately after homogenization, for example 30 g. of oil to each 500 g. of the homogenized mixture. Alternatively or in addition, whole milk powder or a liquid whole milk concentrate, instead of the fat-free milk solids or concentrate, can be used. If it is desirable that the preparation according to the invention should also contain oil soluble vitamins, such as vitamin A and D, the vitamins may be first dissolved in vegetable oil which is then added as described above. In any case, after vegetable oil is added, the mixture is again homogenized.

The cosmetic according to the invention contains preferably at least about 60 parts of the surface-active material (including the amount of any foam depressant present) to 100 parts of milk solids. A skin cleansing remedy containing about 60 to 75 parts of surface-active material to 100 parts of milk solids is particularly suitable as a body skin-cleansing preparation for babies and small children; a cosmetic preparation having a higher amount of surface-active substance (for example 250 parts of surface-active material to 100 parts of milk solids) is suitable for cleansing adult skin. The cosmetic according to the invention is also suitable as a foam-forming additive for the bath.

A preservative, such as a mixture of oxybenzoic methyl ester or oxybenzoic propyl ester (preferably in an amount of about 0.15% by weight of the total weight of the mixture), may optionally be added.

As a vegetable oil any fatty oil that is recognized as suitable for external pharmaceutical use, for example those meeting the requirements of the Deutsche Arzneibuch, can be used, for example peanut oil or olive oil are suitable. For perfuming the mixture, dwarf pine oil may be used for example.

*Example 1*

| | | |
|---|---|---|
| Salt-containing solution of about 30% fatty alcohol ether sulfate in water | parts by weight | 291 |
| Fatty acid alkylolamide | do | 9 |
| Skim milk powder | do | 112 |
| Water | do | 188 |
| Peanut oil (Deutsches Arzneibuch 6) | do | 36 |
| Dwarf pine oil | | (1) |
| Preservative | percent | 0.15 |

[1] As required for perfuming.

This preparation is suitable for cleansing the body skin of babies and small children.

*Example 2*

| | | |
|---|---|---|
| Salt-containing solution of about 30% fatty alcohol either sulfate in water | parts by weight | 873 |
| Fatty acid alkylolamide | do | 9 |
| Skim milk powder | do | 112 |
| Water | do | 188 |
| Peanut oil (Deutsches Arzneibuch 6) | do | 72 |
| Dwarf pine oil | | (1) |
| Preservative | percent | 0.15 |

[1] As required for perfuming.

This preparation is suitable for cleansing the body skin of adults.

Although illustrative embodiments of this invention have been described in detail herein, it is to be understood that the invention is not limited to those precise embodiments, and that various changes and modifications may be effected therein by one skilled in the art without departing from the scope or spirit of the invention, except as defined in the appended claims.

What is claimed is:

1. A method of preparing a stable liquid cosmetic preparation which comprises dissolving at least one surface active agent selected from a group consisting of alcohol sulfate and alkyl sulfonates, the fatty alcohol ether sulfates and the alkyl substituted aromatic sulfonates in water, heating the resulting solution to about 40° C., separately mixing milk solids with water, mixing the heated solution of surface active agent with the milk solids and water at about 40° C. then maintaining the resulting mixture between 70° and 80° C. for 10 to 12 hours and then quickly cooling the mass.

2. A method as claimed in claim 1 in which the milk solids employed is skim milk powder.

3. A liquid cosmetic preparation prepared by the method claimed in claim 1.

References Cited

FOREIGN PATENTS 511,827   8/1939   Great Britain.

OTHER REFERENCES 499,391, 1939, Great Britain (void application).

Sagarin: Cosmetics Science and Technology (1957), pp. 572–573, 845 and 860.

ALBERT T. MEYERS, *Primary Examiner.*

JULIAN S. LEVITT, SAM ROSEN, *Examiners.*

S. FRIEDMAN, *Assistant Examiner.*